United States Patent [19]

Losa

[11] Patent Number: 4,801,927
[45] Date of Patent: Jan. 31, 1989

[54] METHOD AND APPARATUS FOR INDICATING THE DYNAMIC INSTABILITY OF RAILWAY OR TRAMWAY ROLLING STOCK

[75] Inventor: Piero Losa, Pianezza, Italy

[73] Assignee: Fiat Ferroviaria Savigliano S.p.A., Turin, Italy

[21] Appl. No.: 911,244

[22] Filed: Sep. 23, 1986

[51] Int. Cl.$^4$ ............................................... G08B 21/00
[52] U.S. Cl. .................................. 340/669; 105/463.1
[58] Field of Search ............. 340/669, 52 R; 180/271, 180/282; 280/432, 446 B; 105/463.1

[56] References Cited

U.S. PATENT DOCUMENTS 4,308,452 12/1981 Henderson ...................... 340/669 X Primary Examiner—Glen R. Swann, III
Assistant Examiner—Thomas J. Mullen, Jr.
Attorney, Agent, or Firm—Berman, Aisenberg & Platt

[57] ABSTRACT

A method is described for indicating the dynamic instability of railway or tramway rolling stock. The method essentially consists in detecting, by means of at least one accelerometer sensor, the acceleration of the wheel arrangement of the rolling stock in a direction transverse the direction of travel, suitably processing it and subsequently comparing, in a suitable comparator, the processed acceleration value with a reference value $v_O$. The indication of instability is obtained by checking whether the number of processed acceleration values which exceed the said reference value is greater than a predetermined number in a predetermined period of time.

18 Claims, 2 Drawing Sheets

METHOD AND APPARATUS FOR INDICATING THE DYNAMIC INSTABILITY OF RAILWAY OR TRAMWAY ROLLING STOCK

BACKGROUND OF THE INVENTION

The present invention relates to a method and apparatus for indicating the dynamic instability of railway or tramway rolling stock.

As is known, the dynamic instability which appears in railway and tramway rolling stock essentially consists in an oscillating phenomenon of the wheel arrangement of the rolling stock, which develops in a direction transversely of the direction of travel and which increases until it leads to the flange of the wheel rim knocking violently against the rail. In order to prevent the occurrence of this phenomenon from compromising the safety of running and/or from causing unwanted mechanical stresses to the wheel arrangement or to the railway track, it is sought to identify a critical velocity of the rolling stock itself and consequently to establish a maximum speed at which the rolling stock can travel.

It is however observed that the instability can also arise at speeds less than the critical speed or even very much less than the maximum allowed speed and this can occur, for example, because of a reduction in the lateral rigidity of the railway track, a gauge reduction, irregularity in alignment, wear of the wheel rims or else breakage and/or deterioration of the elastic and/or shock absorbing elements etc. In such conditions it is therefore possible that the instability phenomenon is triggered in an entirely unexpected manner, which, because of the filtering action exerted by the shock absorbing elements (for example the suspensions mounted between the carriage and the body, of the rolling stock), can even fail to be brought to the attention of the travellers in time, with consequences which can be extremely detrimental for the safety in movement of the rolling stock itself or even of the train of which the falling stock forms part.

SUMMARY OF THE INVENTION

The object of the present invention is that of providing a method and apparatus by means of which it is possible to detect and promptly indicate the instability phenomena which arise during the running of railway or tramway rolling stock.

The said object is achieved with the present invention in that it provides a method for indicating the dynamic instability of railway or tramway rolling stock, characterised by the fact that it comprises the following operations:

(1) detecting the acceleration of the wheel arrangement of the rolling stock in a transverse sense with respect to the direction of travel of the rolling stock;

(2) suitably processing the said acceleration;

(3) comparing the processed acceleration value with at least one reference value;

(4) counting the processed acceleration values which exceed the said reference value; and (5) emitting a signal whenever the counted number of acceleration values exceed a predetermined number within a period of time of predetermined duration.

The object is likewise achieved by the present invention in that it relates to apparatus for indicating the dynamic instability of railway or tramway rolling stock, characterised by the fact that it comprises:

at least one accelerometer sensor which can be fixed to the said rolling stock in a position such as to provide as signal dependent on the acceleration of the wheel arrangement of the said rolling stock detected in a transverse sense with respect to the direction of travel of the rolling stock;

first signal processing means;

means for comparing the processed signal coming from the said sensor with at least one reference signal, the said comparison means being operable to generate an output signal whenever the absolute value of the processed signal from the said sensor exceeds the said reference signal;

means for counting the said output signals generated by the said comparison means; and second processing means which generate an instability indication whenever the number of said output signals counted by the said counter means exceed a predetermined number within a time period of predetermined duration.

BRIEF DESCRIPTION OF THE DRAWINGS

For a better understanding of the present invention a preferred embodiment will now be described purely by way of non limitative example with reference to the attached drawings, in which.

DETAILED DESCRIPTION OF THE INVENTION

Figure 1:
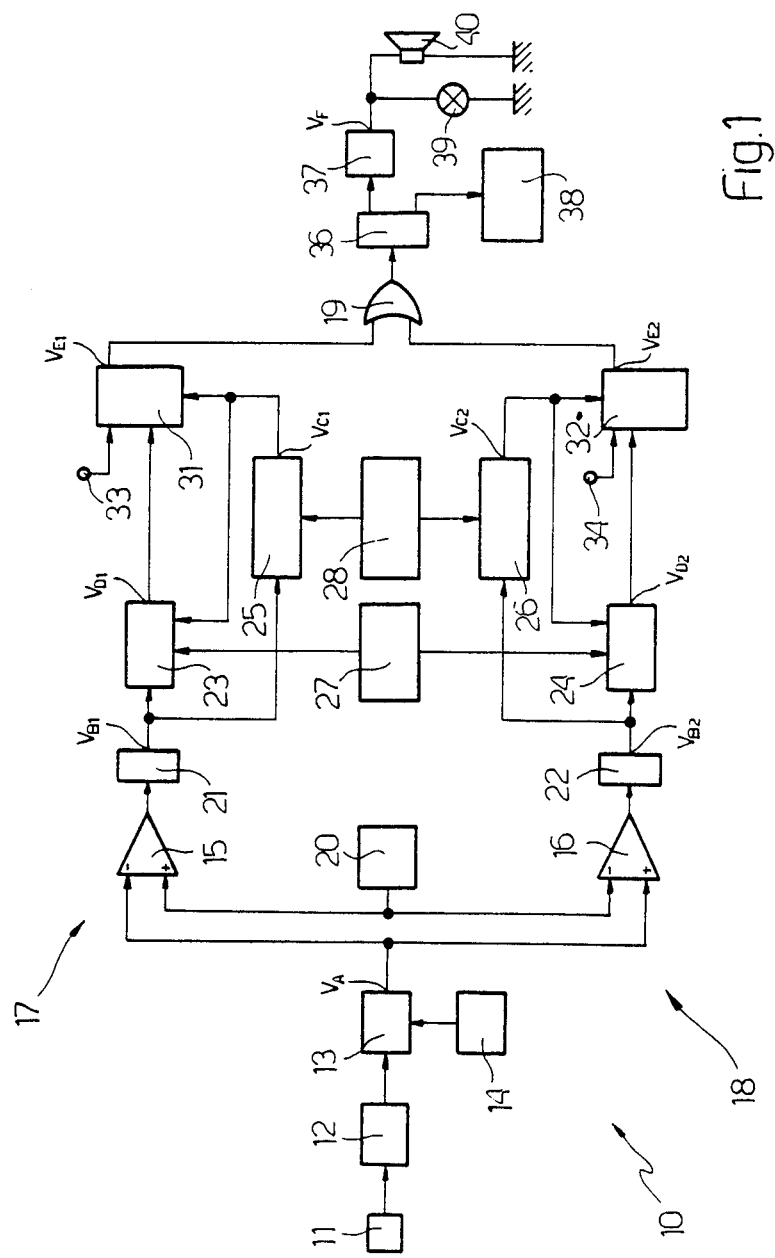
FIG. 1 is a simplified block schematic diagram of apparatus formed according to the principles of the present invention.

With particular reference to FIG. 1, apparatus for indicating the dynamic instability of railway or tramway rolling stock (not illustrated) is generally indicated with the reference numeral 10. In accordance with the present invention the apparatus 10 comprises an accelerometer sensor 11 fixable to the said rolling stock in a position such as to provide a signal dependent on the acceleration of the wheel arrangement of the said rolling stock, detected in a transverse sense with respect to the direction of travel of the rolling stock. By way of example the accelerometer sensor 11 could be mounted on a carriage of a railway wagon or else on a locomotive.

The output of the sensor 11 is connected via an amplifier 12 to the input of a band pass filter 13 which is fed, via signal generator 14, with a signal for regulating its upper cut-off frequency. The output of the filter 13, at which appears a signal indicated $v_A$ and the variation of which is schematically illustrated in FIG. 2a, is connected to inverting and non-inverting inputs respectively of two comparators 15, 16.

These comparators essentially constitute the input blocks of two separate processing chains, generally indicated with the reference numerals 17 and 18, the outputs of which lead respectively to a first and a second input of a logic gate 19 of OR type. More particularly, the processing chains 17, 18 comprise a monostable circuit 21, 22 respectively connected in series to the outputs of comparators 15,16 to the noninverting and inverting inputs respectively of which is supplied a reference signal (indicated $v_o$ in FIG. 2a) of continuous type, adjustable in amplitude and emitted by a generator 20. The outputs of the monostable circuits 21,22 at which appear signals $v_{B1}$ (illustrated in FIG. 2b) and $v_{B2}$ respectively, are connected to the counting inputs of respective counters 23,24 and the enable inputs of respective time bases 25,26. Each counter 23,24 has a count-selection input connected to a respective pulse selector 27 through which it is possible to set into each counter 23,24 the number of pulses which such counter must count starting from a predetermined instant. Similarly, each time base 25,26 has a selection input connected to an associated selector 28, by means of which it is possible to set a predetermined time period which starts to run from the instant when the time base receives a signal from the associated monostable circuit connected upstream thereof. The outputs of the time bases 25 26 at which appear signals $v_{C1}$ (illustrated in FIG. 2c) and $v_{C2}$ respectively, are connected to a preset input of an associated counter 23,24 and to a reset input of an associated D-type bistable 31,32. Each bistable 31,32 has a clock input which is connected to a respective output of associated counters 23,24 at which appear signals $v_{D1}$ (illustrated in FIG. 2d) and $v_{D2}$ respectively. Each bistable 31,32 has moreover a signal input connected to an associated terminal 33, 34 which, in use, is connected to a corresponding dc supply source such as, for example, a battery. Finally, each bistable 31, 32 has an output at which appears a signal $v_{E1}$ (illustrated in FIG. 2e) and a signal $v_{E2}$ respectively, which is connected to the said inputs of the OR type logic gate 19. The output of this latter is connected to the input of a monostable circuit 36 which has a first output connected to the input of a control stage 37 and a second output connected to the input of a pulse counter 38 which can count and memorise the number of pulses emitted by the said monostable circuit 36. The output of the control stage 37, at which appears a signal $v_F$ (illustrated in FIG. 2f) is connected both to a first terminal of an indicator lamp 39 and to a loudspeaker 40, a second terminal of each of which is earthed.

Briefly, the method according to the present invention for indicating the dynamic instability of railway or tramway rolling stock consists essentially in detecting, by means of the accelerometer sensor 11, the acceleration of the rolling stock in a direction transversely of the direction of travel and in subsequently comparing the detected and suitably processed acceleration values with a reference value. The indication of instability is then obtained by testing whether the number of processed acceleration values which exceed the said reference value is greater than a predetermined number in a predetermined period of time.

The operation of the apparatus 10 will now be described, bearing in mind that it constitutes only one of the possible embodiments of the invention. First of all, the apparatus 10 is calibrated in such a way as to adjust (for example between 3 and 20 Hz) the desired upper cut-off frequency of the band-pass filter 13 (the lower frequency is fixed at about 1 Hz), the reference voltage level $v_O$ emitted by the generator 20, the number of pulses which each counter 23, 24 must count before emitting the predetermined output signal $v_{D2}$, and the time period T during which each time base 25, 26 enables the operation of the associated bistables 31, 32.

For simplicity of explanation the part of the operation relating to the processing chain 18 will initially be ignored this latter behaving, as will be seen, in a manner which is entirely equivalent to the processing chain 17.

First of all, supposing that the transverse acceleration detected by the accelerometer sensor 11 produces a corresponding signal the amplitude of which is less than the reference signal $v_O$, then the output of the comparator 15 is constantly at level zero as also is the output of the monostable circuit 21. In these conditions both the time base 25 and the counter 23 are at rest, the output of the former being at high level and it being supposed that, for example, in the latter there have been memorised new pulses to count before its output signal $v_{D1}$ passes from zero level to high level. Likewise, the signal $v_{E1}$ at the output of the bistable 31 is at zero and consequently the signal $v_F$ supplied to the lamp 39 and the loudspeaker 40 is also at zero.

Figure 2:
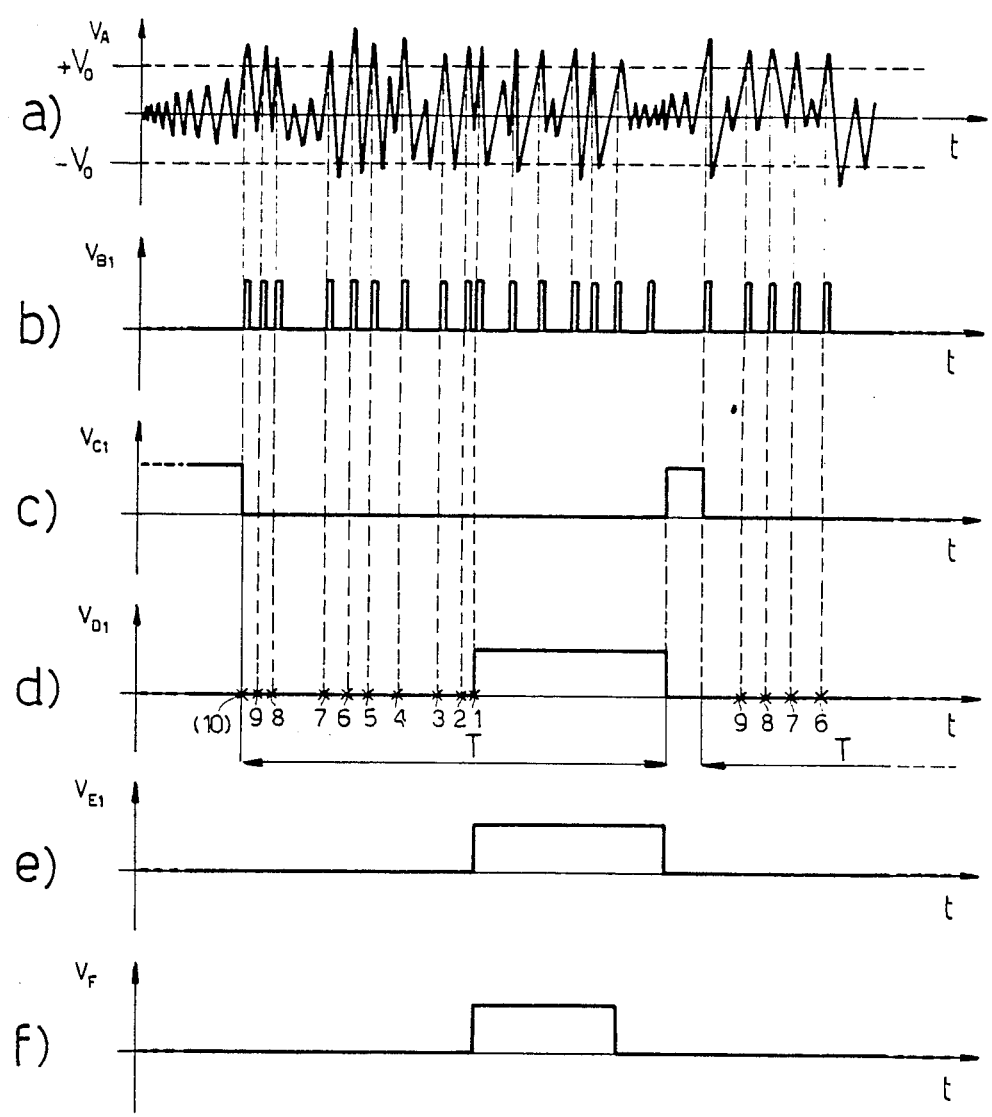
FIG. 2 is a diagram illustrating the variation with time of various signals taken at predetermined points of the block schematic diagram of FIG. 1.

Supposing now that the transverse acceleration detected by the accelerometer sensor 11 increases in intensity until the signal $v_A$ exceeds the reference value $v_O$. In these conditions (see FIG. 2) the consequent commutation of the output signal from the comparator 15 from high level to low level causes the monostable 21 to be enabled, which emits a pulse that enables the time base 25 to start counting the time period T. The output signal $v_{C1}$ of this latter therefore commutes from high level to low level and enables the counter 23 to start counting down in such a way that subsequent pulses which arrive at the signal input of this latter cause a progressive emptying of the contents of the counter itself. Supposing, for example, it is desired to emit an instability signal when 10 pulses have been detected within a time period T, the counter 23 must be programmed with nine pulses in that the first pulse, indicated with the numeral 10 in parentheses in FIG. 2d, has solely the purpose of starting the time base 25 and is therefore not counted by the counter 23 itself. All the pulses which follow, on the other hand, cause a progressive emptying of the contents of the counter 23 and are therefore indicated in a decreasing sense in FIG. 2b. When the counter 23 is completely empty its output signal $v_{D1}$ passes from low level to high level and, supposing that this happens within the said time period T, causes the transfer of the output of the bistable 31 also to high level, the output signal $v_{E1}$ of the bistable 31 thus commutes from low level to high level (FIG. 2e). Consequently, therefore, an enabling pulse is sent via the logic OR gate 19 to the input of the monostable 36 which acts to send both a pulse of predetermined duration (signal $v_F$) to supply the lamp 39 and the loudspeaker 40 via the control stage 37, and a signal, for example a pulse, to the counter 38, which increases its content by one and therefore memorises the fact that at least one instability phenomenon identified according to the previously established parameters, has occurred.

It is evident that if the time period T established by the time base 25 elapses before the counter 23 is completely emptied, no signal $v_{D1}$ at high level can be transmitted to the bistable 31 and therefore no indication of instability is indicated via the lamp 39 or the loudspeaker 40 or registered by the counter 38.

The return to high level of the output signal $v_{C1}$ of the time base 25 causes renewal of the initial conditions in the counter 23 which, in the event of a new count enablement, will start counting again from the value predetermined by the selector 27, that is in the specific case described, from a count of nine.

The processing chain 18 behaves in a manner entirely equivalent to the chain 17. The single variation consists in the fact that the reference signal $v_O$ is interpreted by the comparator 16 as a negative threshold. This also allows those negative excursions of the signal $v_A$ the absolute values of which are greater than the reference signal $v_O$ to be detected for the purpose of being able to take account of the specific characteristics of the signal $v_A$ which is assymetric with respect to the time axis.

From a study of the characteristics of the method and apparatus of the present invention the advantages which can be obtained will be evident. First of all the instability of the rolling stock is detected promptly and immediately indicated both in an optical and acoustic manner. This allows, for example, the driver to be able to take immediate action such as, for example, that of reducing the speed of the rolling stock. Moreover, since the number of times which the instability has appeared is memorised, it is in any case possible, by effecting periodic monitoring of the indication presented by the counter 38, to verify if the rolling stock utilised in normal operating conditions have exhibited instability phenomena. This could be particularly useful for identifying possible breakdowns (wear of wheel rims, breakage or deterioration of suspension springs and/or shock absorbers etc.,) of the rolling stock. In both cases this results in an overall improvement in the operating safety of rolling stock carrying apparatus formed according to the present invention.

Finally, it is clear that the characteristics of the method and apparatus 10 described hereinabove can be modified and varied without by this departing from the scope of the present invention.

For example, the apparatus 10 could be made by utilising a microprocessor in which case it is apparent that the block schematic diagram described hereinabove would be entirely different.

Moreover, without departing from the concept of detecting the acceleration of the wheel arrangement in a transverse sense, it is evident that the subsequent processing of the signals, rather than utilising a simple amplifier with a band-pass filter in series, could be effected in other ways such as, for example, by performing suitable operations (integration, differentiation etc.,) on the detected signal.

I claim:

1. A method for indicating dynamic instability in railway or tramway rolling stock, characterized by the fact that it comprises the following operations:
   (1) continuously detecting the acceleration of the wheel arrangement of the rolling stock in a transverse sense with respect to the direction of movement of the rolling stock itself;
   (2) suitably processing the said acceleration to obtain sequential acceleration values;
   (3) comparing the processed acceleration values with at least one reference value;
   (4) counting the number of processed acceleration values which exceed the said at least one reference value; and
   (5) emitting an instability signal whenever the number of processed acceleration values counted which exceed said at least one reference value is greater than a predetermined number within a time period of predetermined duration.

2. A method according to claim 1 and in which the said processed acceleration values assume both positive and negative sign, characterised by the fact that the comparison of the said detected acceleration values takes place both with respect to a reference value of positive sign and with respect to a reference value of negative sign.

3. A method according to claim 1, characterised by the fact that it includes the further operation consisting in counting and memorising successive instability indications.

4. Apparatus for indicating the dynamic instability of railway or tramway rolling stock, characterised by the fact that it comprises:
   at least one accelerometer sensor (11) fixable to the said rolling stock in a position such as to provide a signal dependent on the accelerations of the wheel arrangement of the said rolling stock detected in a transverse sense with respect to the direction of travel of the rolling stock itself;
   first processing means for the said signal;
   means for comparing the said processed signal ($v_A$) from the said sensor (11) with at least one reference signal ($v_O$), the said comparison means being operable to generate an output signal ($v_{B1}$, $v_{B2}$) whenever the absolute value of the said processed signal ($v_A$) from the said sensor (11) exceeds the said reference signal ($v_O$);
   counter means for counting the said output signals ($v_{B1}$, $v_{B2}$) generated by the said comparison means; and
   second processing means which generate an instability signal whenever the number of times that the said output signal ($v_{B1}$, $v_{B2}$) counted by the said counter means exceeds a predetermined number within a time period (T) of predetermined duration.

5. Apparatus according to claim 4, characterised by the fact that the said first processing means, which include at least one filter (13), are interposed between the said accelerometer sensor (11) and the said comparison means.

6. Apparatus according to claim 5, characterised by the fact that the said filter (13) is of bandpass type.

7. Apparatus according to claim 6, characterised by the fact that the upper cut-off frequency of the said band-pass filter (13) lies between 3 and 20 Hz.

8. Apparatus according to claim 7, characterised by the fact that the said comparison means essentially comprise a comparator (15, 16) to one output of which is connected, in series, an associated monostable circuit (21,22).

9. Apparatus according to claim 6, characterised by the fact that it includes means (14) for adjustment of the said upper cut-off frequency of the said filter (13).

10. Apparatus according to claim 4, characterised by the fact that it includes generator means (20) for the said reference signal ($v_O$).

11. Apparatus according to claim 10, characterised by the fact that the said generator means (20) are operable to generate the said reference signal ($v_O$) with adjustable amplitude.

12. Apparatus according to claim 4, characterised by the fact that the said comparison means, the said counter means, and the said second processing means are duplicated and disposed in two processing chains (17,18) essentially connected in parallel and having, in particular, a common input to which the said signal ($v_A$) from the said accelerometer sensor (11) is supplied, and respective outputs leading to summation means (19).

13. Apparatus according to claim 12, characterised by the fact that it includes selector means (27,28) operable to set the said predetermined number of pulses counted in the said counter means, and the said predetermined duration of the said time period (T) in the said second processing means.

14. Apparatus according to claim 4, characterised by the fact that each said second processing means comprises at least one time base (25,26) having an input which can be enabled by the said comparison means and an output operable to enable the said counter means as well as means (31,32) for generating the said instability signal.

15. Apparatus according to claim 14, characterised by the fact that the said means (31,32) for generating the said instability signal are essentially constituted by bistable circuits (31,32) to a clock input of which is supplied a signal ($v_{D1}$, $v_{D2}$) generated by the said counter means whenever these latter count, within the said time period (T) of predetermined duration, the said predetermined number of said output signals ($v_{B1}$, $v_{B2}$).

16. Apparatus according to claim 4, characterised by the fact that it includes means (39,40) for indicating the detection of the said instability.

17. Apparatus according to claim 16, characterised by the fact that it includes means (38) for counting and memorising the said instability signals.

18. Apparatus according to claim 17 characterised by the fact that the said indicator means (39, 40) and the said counting and memorising means (38) of the said instability are essentially supplied by means of a monostable circuit (36).

* * * * *